United States Patent [19]

Asanuma et al.

[11] Patent Number: 4,762,897
[45] Date of Patent: Aug. 9, 1988

[54] PROCESS FOR RECOVERING A MIXTURE OF UNREACTED ETHYLENE AND PROPYLENE

[75] Inventors: Tadashi Asanuma; Yoshiyuki Funakoshi, both of Takaishi; Tatuo Ohoka, Izumi, all of Japan

[73] Assignee: Mitsui Toatsu Chemicals, Incorporated, Tokyo, Japan

[21] Appl. No.: 45,718

[22] Filed: Apr. 29, 1987

Related U.S. Application Data

[63] Continuation of Ser. No. 804,614, Dec. 5, 1985, abandoned.

[30] Foreign Application Priority Data

Dec. 12, 1984 [JP] Japan ................. 59-260796

[51] Int. Cl.⁴ ..................... C08F 6/04; C08F 210/02
[52] U.S. Cl. ........................... 526/68; 526/77; 526/87; 526/348; 525/54; 525/240; 203/81; 203/DIG. 18; 585/809
[58] Field of Search .............. 526/68, 77, 87; 525/54, 525/240; 203/81, DIG. 18; 585/809

[56] References Cited

U.S. PATENT DOCUMENTS

| | | | |
|---|---|---|---|
| 3,322,652 | 5/1967 | Huval | 203/81 X |
| 3,565,873 | 2/1971 | Sutherland, Jr. et al. | 526/68 X |
| 3,644,583 | 2/1972 | Scoggin | 525/240 X |
| 4,065,609 | 12/1977 | Willmore | 526/61 |
| 4,075,287 | 2/1978 | Scoggin | 526/68 X |
| 4,442,271 | 4/1984 | Rau et al. | 526/68 X |

FOREIGN PATENT DOCUMENTS

| | | | |
|---|---|---|---|
| 0908285 | 10/1962 | United Kingdom | 526/68 |
| 2094319 | 9/1982 | United Kingdom | 526/68 |

Primary Examiner—Joseph L. Schofer
Assistant Examiner—F. M. Teskin
Attorney, Agent, or Firm—Oblon, Fisher, Spivak, McClelland & Maier

[57] ABSTRACT

In a copolymerization process of propylene, a mixture of unreacted propylene and ethylene is recovered. It is then fed to a distillation system which includes first and second distillation columns. The distillation system is operated in such a way that the temperature and pressure of the top of the second distillation column remain constant and an ethylene-propylene mixture can be recovered at a constant ethylene/propylene ratio from the top of the second distillation column. By using the thus-recovered ethylene-propylene mixture, the copolymerization reaction can be carried out under excellent control so that the ethylene-propylene copolymer can be obtained with uniform quality and properties.

2 Claims, 1 Drawing Sheet

PROCESS FOR RECOVERING A MIXTURE OF UNREACTED ETHYLENE AND PROPYLENE

This application is a continuation of application Ser. No. 06/804,614, filed on Dec. 5, 1985, now abandoned.

BACKGROUND OF THE INVENTION

1. Field of the Invention

This invention relates to a copolymerization process of propylene, and more specifically to a process for the reutilization of recovered unreacted propylene and ethylene.

2. Description of the Prior Art

It has been well known to improve the impact resistance of polypropylene, especially, its impact resistance at low temperatures by copolymerizing propylene with ethylene. It has also been known to separate a mixture of unreacted propylene and ethylene into an ethylene-propylene mixture and propylene for their recovery and reutilization (see, Japanese Patent Publication No. 42379/1972). This recovery and reutilization of such unreacted propylene and ethylene are extremely beneficial when producing a block copolymer of propylene by the reaction of ethylene and propylene at a relatively high ethylene/propylene ratio, particularly, when producing the block copolymer by bulk polymerization while using propylene itself as a reaction medium.

The above process is however accompanied by a drawback that in order to use a recovered ethylene-propylene mixture, the recovered ethylene-propylene mixture has to be mixed in advance with a fresh supply of propylene or ethylene to adjust the concentration of ethylene to a predetermined constant level or the amounts of ethylene, propylene and/or an ethylene-propylene mixture to be charged have to be controlled in a cumbersome manner to maintain the concentration of ethylene in a polymerization tank at a prescribed constant level because the concentration of ethylene in the recovered ethylene-propylene mixture varies depending on the concentration of ethylene in the corresponding mixture of unreacted propylene and ethylene when a distillation column is operated under constant conditions.

SUMMARY OF THE INVENTION

The present inventors have carried out an extensive investigation with a view toward developing a method for solving the above-described problem. As a result, it has been found that the above problem can be solved by using an ethylene-propylene mixture separated by distillation in a special process, leading to completion of this invention.

An object of this invention is to provide a process for effecting efficient copolymerization of propylene and ethylene by using a recovered mixture of unreacted propylene and ethylene.

In one aspect of this invention, there is thus provided a process for copolymerizing propylene and ethylene by using a recovered mixture of unreacted propylene and ethylene as at least parts of propylene and ethylene to be introduced into a polymerization tank in which the copolymerization of the propylene and ethylene is carried out, which comprises:

introducing the recovered mixture of unreacted ethylene and propylene into a first distillation column at a first location other than the top and bottom of the distillation column and then drawing a fraction, from which components having boiling points higher than the boiling point of propylene have been removed, out of the distillation column at a second location other than the top and bottom of the distillation column;

introducing the fraction into a second distillation column, and operating the second distillation column in such a way that the pressure of the top of the second distillation column is maintained constant, the amount and/or temperature of a cooling medium to be fed to a cooler provided at the top of the second distillation column are controlled so as to make constant the temperature of a mixture of ethylene and propylene cooled and condensed by the cooler and propylene is drawn from the bottom of the second distillation column so as to maintain constant the temperature of the top of the second distillation column, whereby the ethylene-propylene mixture is obtained from the top of the second distillation column; and introducing the thus-obtained ethylene-propylene mixture into the polymerization tank.

According to the process of this invention, an ethylene-propylene mixture can be recovered with a constant composition for its reutilization. Therefore, the copolymerization reaction can be carried out stably, leading to a copolymer of uniform quality. The process of this invention is therefore valuable from the industrial viewpoint.

The above and other objects, features and advantages of the present invention will become apparent from the following description and the appended claim, taken in conjunction with the accompanying drawing.

DETAILED DESCRIPTION OF THE INVENTION

Figure 1:
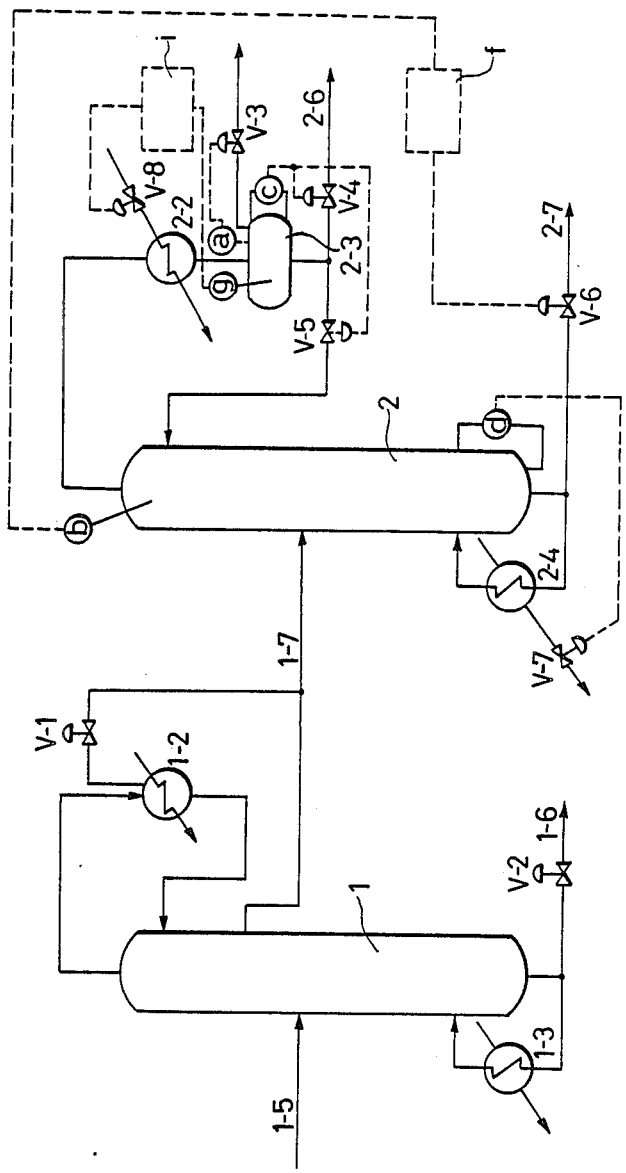
FIG. 1 is a flow chart of a distillation system suitable for use in practicing the process of this invention.

As a propylene-ethylene copolymerization process to which the process of this invention may be applied with particularly good effects, may be mentioned their block copolymerization process in which propylene is either polymerized alone or copolymerized with a small amount of ethylene (first-stage polymerization) and a copolymerization reaction is then conducted with a high ethylene/propylene ratio (second-stage polymerization). It is particularly useful to apply the process of this invention to bulk polymerization of vapor-phase polymerization which makes use of propylene itself as a reaction medium and results in recovery of unreacted monomers in large volumes. It is also effective to apply the process of this invention where the second-stage polymerization is conducted batchwise, because the polymerization time is relatively short and it is hence difficult to control the amount of ethylene, propylene or an ethylene-propylene mixture, which is to be introduced into a polymerization tank, by detecting the concentration of ethylene in the polymerization tank. As apparent from the features of the present invention, no particular limitations are necessarily imposed on the polymerization temperature and pressure or the optional incorporation of hydrogen as a molecular weight modifier. The polymerization may be carried out at $-70°$ C. to $+150°$ C. and normal pressure to 50 kg/cm$^2$G, which conditions are routinely employed.

Any particular limitation is necessarily vested either on the catalyst system to be employed in the present invention, as readily envisaged from the features of the present invention. Any one of known catalysts which are used for the copolymerization of propylene may be successfully used, including catalysts composed respectively of titanium trichloride catalyst, which has been obtained by reducing titanium tetrachloride with metallic aluminum or an organoaluminum compound and then subjected the resultant titanium trichloride to various activation treatments, and organometal compounds such as organoaluminum compounds; and catalyst systems composed respectively of a catalyst, which is in turn composed of titanium trichloride or titanium tetrachloride supported on a carrier such as a magnesium halide, and organometal compounds such as organoaluminum compounds.

It is important in the process of this invention to use the recovered mixture of unreacted propylene and ethylene after subjecting it to a specific operation for its separation. The recovered mixture of unreacted ethylene and propylene is therefore introduced into a first distillation column, in which hydrogen gas employed optionally as a molecular weight modifier or an inert gas such as nitrogen is removed from the top while components having boiling points higher than propylene, such as an inert hydrocarbon employed for the dilution of a catalyst and for the prevention of line closure or blocking and containing 5 or more carbon atoms, are removed from the bottom. The resulting ethylene-propylene mixture, which has been separated and purified in the first distillation column, is then introduced into a second distillation column. The charged ethylene-propylene mixture is separated into a top fraction containing ethylene and propylene at a prescribed constant ethylene/propylene ratio and a bottom propylene fraction which is practically free of ethylene. In order to maintain the composition of the ethylene-propylene mixture to be drawn from the top, it is essential to operate the second distillation column under the following conditions. It is necessary to control the second distillation column so that the pressure of the top is kept constant and the temperature of the mixture of ethylene and propylene cooled and condensed by a cooler provided with the top remains constant. Furthermore, the amount of propylene to be drawn from the bottom has to be controlled so as to keep the temperature of the top at a constant level. In order to maintain the pressure of the top at a constant level, a usual pressure regulator composed in combination of a usual pressure detector and a valve may be relied upon.

The control of the temperature of the ethylene-propylene mixture cooled and condensed by the cooler provided with the top can be effected by changing the amount and/or temperature of a cooling medium to be introduced into the cooler. Namely, its control may be effected by detecting the temperature of the cooled and condensed ethylene/propylene mixture and depending on the thus-detected temperature, by either changing the degree of opening of the valve to control the amount of the cooling medium to be introduced into the cooler or adjusting the load of a refrigerator to change the temperature of the cooling medium itself.

While maintaining the pressure of the top of the second distillation column, the temperature of the top is detected and the amount of propylene to be drawn from the bottom is then controlled to bring the temperature into conformity with a preset level. Namely, if the temperature of the top is lower than the preset level, it is necessary to control the second distillation column in such a way that less propylene is drawn out from the bottom. If the temperature of the top is higher than the preset level on the contrary, it is necessary to control the second distillation column in such a way that more propylene is drawn out from the bottom.

The manner of this control will hereinafter be described with reference to the accompanying sole drawing.

FIG. 1 is a flow chart of an operation for the distillation and separation of a recovered mixture of unreacted ethylene and propylene. Designated at numeral 1 is a first distillation column, whereas a second distillation column is indicated at numeral 2. The mixture is introduced through a line 1-5 into the first distillation column 1. A high boiling-point fraction of the mixture is removed through a line 1-6 and the remaining ethylene-propylene mixture is introduced through a line 1-7 into the second distillation column 2. Numerals 1-2 and 2-2 indicate heat-exchangers for cooling their corresponding top vapors while numerals 1-3 and 2-4 indicate heat-exchangers for heating purpose.

In the second distillation column 2, the pressure of its top is detected by a detector a and the degree of opening of a valve v-3 is controlled in accordance with the result of the detection so as to maintain the pressure of the top at a constant level.

An ethylene-propylene mixture, which has been cooled and condensed by the heat-exchanger 2-2 provided with the top, is introduced into a tank 2-3. Valves v-5, v-4 are controlled to keep the level of the ethylene-propylene mixture constant in the tank 2-3. The level is detected by a level gauge c. Here, the controllability of the second distillation column 2 may be improved if a controller is additionally provided to control the balance between the amount of the ethylene-propylene mixture to be returned to the second distillation column 2 and the amount of the ethylene-propylene mixture to be drawn out through a line 2-6. In a simpler manner, it may however still be effective to control the valve v-5 in accordance with the output of the level gauge c while maintaining the amount of the ethylene-propylene mixture, which is to be drawn out of the second distillation column, at a constant level.

The temperature of the cooled and condensed ethylene-propylene mixture can be changed by comparing each signal, which is proportional to its corresponding temperature detected by a thermometer g, with a preset value input in a controller i and then controlling a valve v-8 to change the amount of the cooling medium and thus to adjust the temperature of the ethylene-propylene mixture to a preset level. Alternatively, the load of a refrigerator may be changed to adjust the temperature of the cooling medium.

In accordance with the top temperature detected by the thermometer b, the amount of liquefied propylene to be drawn from the bottom is controlled. Here, a suitable arithmetic routine may be followed to control the amount of propylene to be recycled to the heat-exchanger 2-4 provided with the bottom and that of propylene to be drawn. However, it is still effective to change only the amount of propylene, which is to be drawn out, in accordance with the top temperature while maintaining constant the amount of propylene to be recycled from the bottom (i.e., the sum of the amount of propylene to be drawn out and that of propylene to be delivered to the heat-exchanger 2-4). Here, it is necessary to control the amount or pressure of heating steam to be fed to the heat-exchanger 2-4 so that the liquid level in the bottom is maintained constant. In the illustrated embodiment, a valve v-7 is controlled by the output of the level gage d. The drawing also shows a converter f by which each output from the thermometer b is converted to an output for controlling a valve v-6.

According to the process of this invention, the recovered mixture of unreacted propylene and ethylene is separated and purified into an ethylene-propylene mixture in which the ratio of the ethylene to propylene is at a prescribed constant level. By using the thus-separated and purified ethylene-propylene mixture, the copolymerization reaction can be carried out under excellent control. By controlling the distillation system in such a way that the temperature and pressure of the top of the second distillation column remain constant, an ethylene-propylene mixture can be recovered at the constant ethylene/propylene ratio from the top of the second distillation column.

Example:

Results of test runs are tabulated below. The results demonstrate that so long as the second distillation column is controlled in accordance with the process of this invention, the composition of the mixture to be drawn out through the line 2-6 remain constant even if the composition and amount of the mixture, which is fed through the line 1-7 to the second distillation column, varies.

a polymerization tank where said mixture is copolymerized, which comprises:

introducing a recovered mixture of unreacted ethylene and propylene into a first distillation column at a first location other than the top or bottom of the first distillation column, and then withdrawing a fraction of components having boiling points higher than the boiling point of propylene from the bottom of the first distillation column, and withdrawing a fraction containing propylene and ethylene from the first distillation column at a second location other than the top or bottom of the first distillation column; and introducing said withdrawn ethylene-propylene fraction into a second distillation column, and withdrawing an ethylene-propylene mixture from the top of said second distillation column under conditions in which the pressure at the top of the second distillation column is maintained constant and the withdrawn ethylene-propylene mixture is cooled in a cooler which is cooled by control of the amount and/or temperature of a cooling medium fed to the cooler, thereby forming an ethylene-propylene condensate, maintained at a constant temperature, which is then withdrawn as the ethylene-propylene mixture which is introduced into said polymerization tank, and withdrawing amounts of a bottom

|         | Line 1-7 | | Line 2-6 | | |
| --- | --- | --- | --- | --- | --- |
| Run No. | amount of liquefied mixture (kg/hr) | composition* (by weight) | amount of liquefied mixture (kg/hr) | composition* (by weight) | Top pressure/ top temperature |
| 1 | 11460 | 1/11.4 | 1580 | 1.27/1 | 20.0 K/G/15° C. |
| 2 | 11460 | 1/9.2 | 1936 | 1.27/1 | 20.0 K/G/15° C. |
| 3 | 13740 | 1/8.53 | 2284 | 1.27/1 | 20.0 K/G/15° C. |
| 4 | 13740 | 1/10.1 | 1946 | 1.27/1 | 20.0 K/G/15° C. |

*Ethylene/propylene.

Having now fully described the invention, it will be apparent to one of ordinary skill in the art that many changes and modifications can be made thereto without departing from the spirit or scope of the invention as set forth herein.

We claim:

1. A process for recovering a mixture of unreacted propylene and ethylene which is used as at least a part of the propylene and ethylene which is introduced into liquid consisting of propylene from said second distillation column such that the temperature at the top of said second distillation column is maintained constant.

2. The process of claim 1, wherein the pressure at the top of the second distillation column is maintained by the opening of a control valve which regulates the amount of ethylene-propylene withdrawn from said second distillation column.

* * * * *